United States Patent [19]

Meadows et al.

[11] Patent Number: 5,724,133
[45] Date of Patent: *Mar. 3, 1998

[54] INTERIOR INSPECTION METHOD AND APPARATUS FOR ENCLOSED SPACES

[75] Inventors: Troy Meadows, Crosby; Richard W. Winstead, Bridge City; Robert L. Mitchem, Crosby, all of Tex.

[73] Assignee: Rescar, Inc., Downers Grove, Ill.

[ * ] Notice: The term of this patent shall not extend beyond the expiration date of Pat. No. 5,565,981.

[21] Appl. No.: 698,571

[22] Filed: Aug. 15, 1996

(Under 37 CFR 1.47)

Related U.S. Application Data

[63] Continuation-in-part of Ser. No. 544,472, Oct. 18, 1995, Pat. No. 5,565,981, which is a continuation of Ser. No. 208,687, Mar. 11, 1994, abandoned.

[51] Int. Cl.⁶ .................................................. G01N 21/88
[52] U.S. Cl. ................................................ 356/241
[58] Field of Search ....................... 356/241, 237, 356/378; 15/324, 339; 73/151; 250/256; 348/45, 65, 68, 85; 385/116, 117; 128/4–11, 17

[56] References Cited

U.S. PATENT DOCUMENTS

| Re. 31,074 | 11/1982 | Nolte | 356/241 |
| 4,557,598 | 12/1985 | Ono et al. | 356/241 |

FOREIGN PATENT DOCUMENTS

| 1123366 | 9/1956 | France | 356/241 |
| 0010141 | 1/1985 | Japan | 356/241 |
| 0169746 | 9/1985 | Japan | 356/241 |

Primary Examiner—Hoa Q Pham
Attorney, Agent, or Firm—Myers & Associates, Ltd.

[57] ABSTRACT

An inspection apparatus for viewing and making video recordings of the interior of an enclosed space of an enclosure having an elongated body. A pair of housings are mounted on the lower end of the elongated body and respectively contain a light source for illuminating an area of the enclosed space and a video camera for creating an image of the illuminated area of the enclosed space. The video camera includes a video magnetic tape media for recording the images illuminated by the light source. A television monitor is mounted on the upper portion of the elongated body for simultaneously viewing the images created by the video camera.

11 Claims, 7 Drawing Sheets

INTERIOR INSPECTION METHOD AND APPARATUS FOR ENCLOSED SPACES

This is a continuation-in-part of application, Ser. No. 08/544,472 filed Oct. 18, 1995, now U.S. Pat. No. 5,565,981, which is a continuation application, Ser. No. 08/208,687 filed Mar. 11, 1994 now abandoned.

BACKGROUND OF THE INVENTION

1. Field of the Invention

This invention relates to an inspection method and apparatus for enclosed spaces and more particularly, to an interior inspection apparatus and method for tanks and vessels, such as on rail cars, and other enclosed spaces.

2. Description of the Prior Art

A significant problem exists in industry for satisfactorily inspecting enclosed internal spaces that transport or store a multitude of different chemicals, petroleum products, and other substances. Many liquids stored in a tank or vessel may be toxic and corrosive, and can be hazardous to humans. Prior to introducing these substances into a vessel or tank, it is desirable to inspect the interior of the tank or vessel to evaluate its suitability for continued use and determine whether repairs or other servicing is required for safe storage and/or transport of the substances. Such inspections are needed to consider numerous conditions within the vessel or tank prior to cleaning, repairing, or filling. The vessel or tank should be inspected for overall quality assurance of the structure and verify the level of corrosion and the like within the interior. During these inspections, the physical integrity of the lining of the tank can be evaluated as well as the status of any coils or other appurtenances that may be present within the confined space.

In many cases, it is necessary to make a residue measurement prior to cleaning or filling the vessel and otherwise generally inspect the enclosed space for safe pre-cleaning. This inspection of the interior of tanks or hoppers is particularly necessary for safe operation of rail cars which transport a host of chemicals and other products that can be hazardous to humans or the environment, if not safely contained within the rail car.

Because of the size and configurations of large vessels or tanks in the field, it is extremely difficult to gain access to the interior of the enclosed space for an adequate inspection. In addition, it can be unsafe for an individual to enter into the enclosed space even when access is possible, due to the potentially dangerous nature of the materials that were stored or transported in the vessel or tank.

In the past, internal inspections have been made either by physical entry or by various types of optical equipment, such as periscopes and the like. Such known techniques of visualizing the condition of an enclosed space are not optimumly satisfactory in providing an inspector with a complete visualization of the condition of the interior and are not capable of providing a permanent visual and audio record for later reference. The attainment of effective visualization of the interior of vessel tank or any other confined space is an important need in the industry for reasons of economy, safety, sustained service of the equipment, and proper subsequent handling of materials being transported or stored. Accordingly, it is desirable in the prior art to provide an improved visual inspection method and apparatus for effectively viewing and evaluating the physical condition of the interior of a confined space.

SUMMARY OF THE INVENTION

It is therefore an objective of the present invention to provide an improved interior inspection method and apparatus for inspecting the physical condition of the interior of tanks, vessels, or other enclosed spaces in which a variety of chemicals, liquids, and the like are stored, transported or otherwise handled, or into which access for inspection is limited because of physical constraints. The invention of the application is particularly effective in allowing for the periodic inspection of the tanks of rail cars and other vehicles. The inspection device herein disclosed is readily handled and operated by a single operator, is compact in design and is easy to use. The invention of the application includes a housing that is inserted into the hatch or access opening of the confined space and includes an effective lighting source capable of illuminating all areas of the tank as the housing is manipulated. The imaging system utilizes a video tape system in which the operator may view the interior with great effectiveness and make audio observations and record images of the interior for later reference. The imaging system of the invention can be operated safely by an individual without exposure to potential unsafe conditions which may exist within the interior of the vessel or tank.

The imaging system not only is highly effective in inspecting the interior of a tank, vessel, or hopper on a rail car or other vehicle, but can be used to view the interior of any enclosed space that may be inaccessible or hazardous, or is an enclosed space that requires periodic maintenance and control. Efficient inspections can be made by the invention by an operator situated exteriorly of the enclosed space for safety and ease of operation.

During inspections, the quality of the walls and lining of the enclosed space can be evaluated by the invention for structural integrity, corrosion levels, material residue, and the like prior to cleaning or loading. Subsequent to cleaning, the effectiveness of a cleaning or repair operation can also be evaluated by the invention herein disclosed. The inspection method and apparatus is also useful to review the quality of coils or other devices that may be present in the confined space.

DESCRIPTION OF THE PREFERRED EMBODIMENTS

Figure 1:
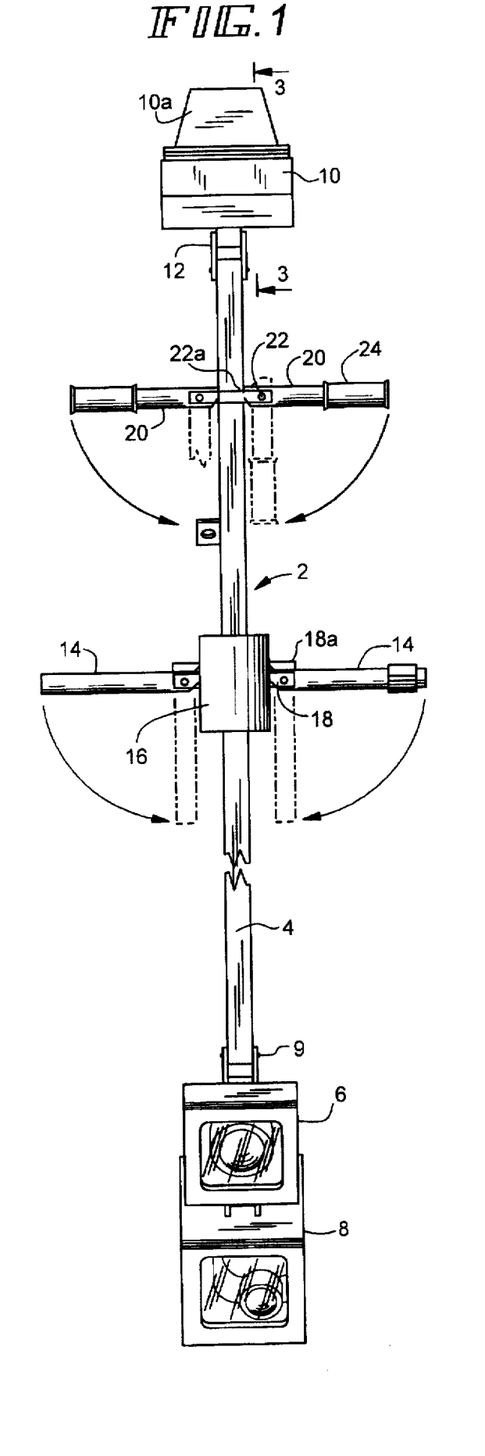
FIG. 1 is a front elevational view of the interior inspection apparatus of a first embodiment of the invention.
Figure 2:
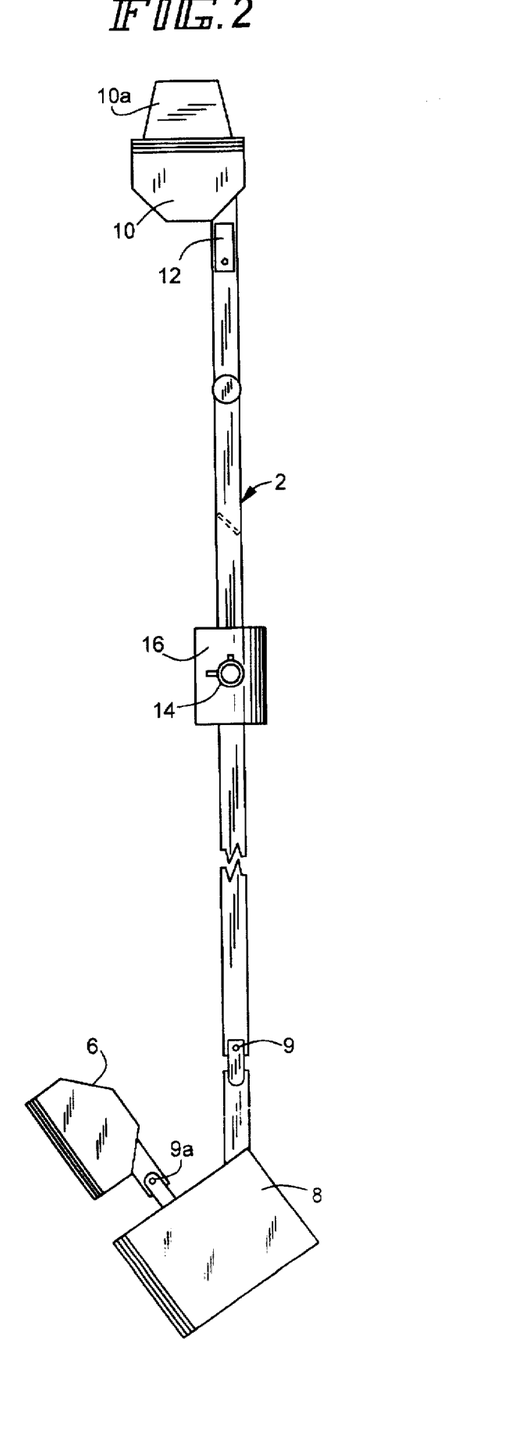
FIG. 2 is a side elevational view of the interior inspection apparatus of FIG. 1.

Referring to FIG. 1, there is illustrated the imaging apparatus 2 of the invention for inspecting and evaluating the condition of the interior of a vessel, tank, or other enclosed space into which access is limited or presents hazardous conditions. The imaging apparatus 2 includes an elongated hollow housing 4 constructed from a suitably rigid material, such as aluminum, plastic, and the like. The elongated housing 4 is intended to be inserted through an access opening (not shown) of a tank, vessel, or other confined space, such as through the coaming of a railway tank car or hopper. A sealed light housing 6 and a video camera/recorder housing 8 are affixed by a threaded latch assembly 10 to the bottom of housing 4. The latch assembly 9 permits the video camera/recorder housing 8 to be pivotally adjusted relative to the axis of housing 4 and fixed at a selected position. The light housing 6 is mounted on the video camera/recorder housing 8 by a threaded bracket assembly 9a for pivotal movement for selective adjustment and includes a threaded member that can be tightened to position light housing 6 at a fixed selected position.

Figures 3, 4:
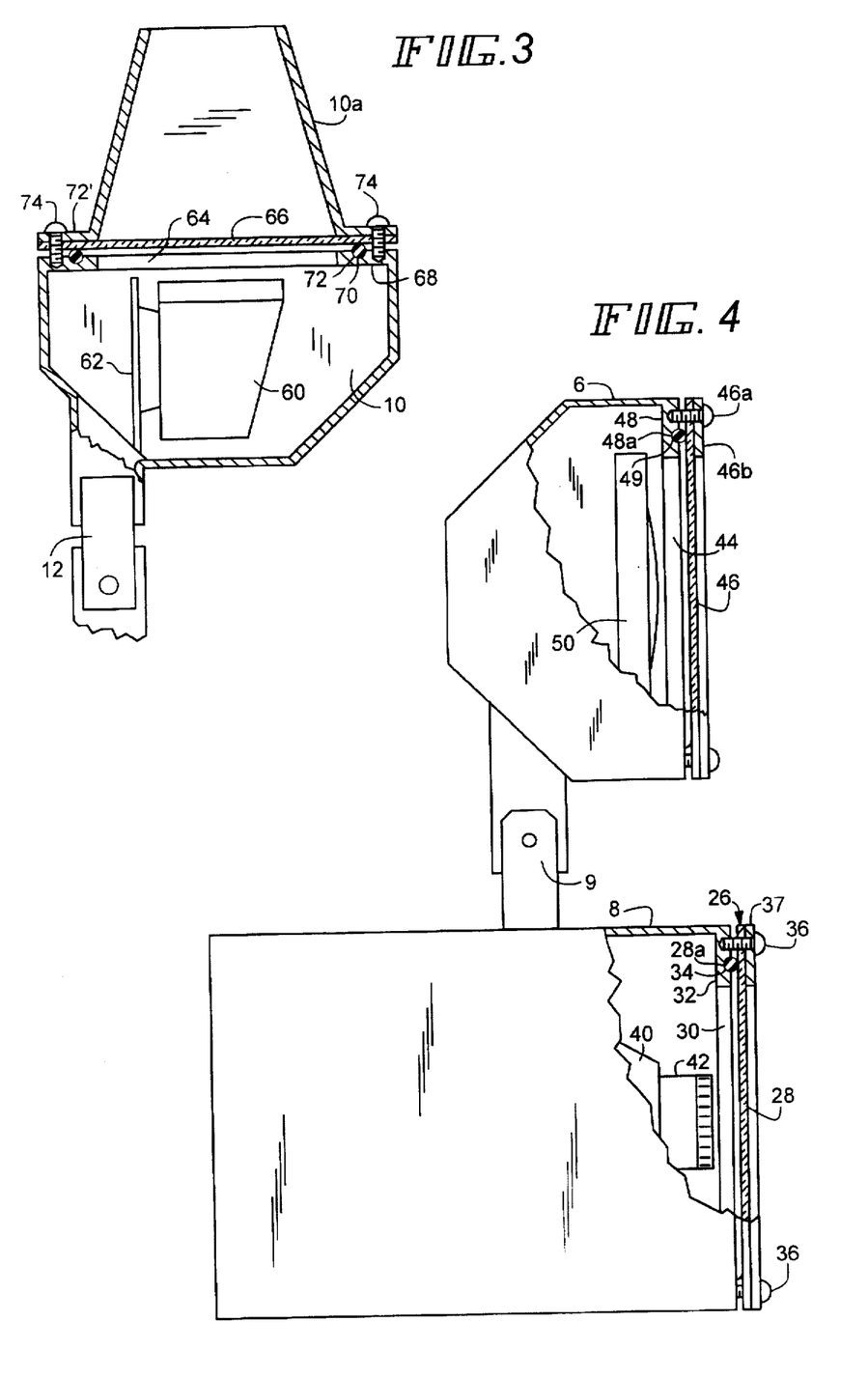
FIG. 3 is a partial side view, with parts in section, taken along lines 3—3 of FIG. 1.
FIG. 4 is a partial side view, with parts broken away in section, of the interior inspection apparatus of FIG. 1 showing the light source and video camera housing of FIG. 1.

A monitor receptacle 10 and viewing hood 10a are affixed by threaded bracket assembly 12 to the upper end of the housing 4. As seen in FIG. 3, the hood 10a is in the form of a truncated cone having an open end 10b through which the interior of monitor housing 6 can be clearly viewed in the presence of glare from sunlight or bright lights. The threaded bracket assembly 12 permits the monitor housing 10 to be pivotally adjusted and fixed at a convenient viewing position relative to housing 4.

An opposed pair of pivotal support arms 14 are affixed for swiveling movement as shown in phantom on a cylindrical support 16 which is suitably affixed to the elongated housing 4. The support arms 14 are attached to cylindrical support 16 by brackets 18 having an upper portion 18a. The upper portion 18a creates an engagement area that bears against the cylindrical member 16 in an outward position of support arms 14 for supporting the housing 4 while extending into a vessel or tank. For example, the support arms 14 engage the top of the coaming of a hopper car tank to vertically support housing 4 while it extends into the tank and positions the light housing 6 and video camera/recorder housing 8 within the confined space for an inspection of its interior. The support arms 14 can be folded against the housing 4 for convenient transport of the inspection apparatus 2. A pair of opposed handles 20 are pivotally mounted above the support arms 14 by brackets 22. The handles 20 can be folded flat against housing 4 for transport as shown in phantom in FIG. 1. An upper portion 22a of brackets 22 engages housing 4 in an outward position of handles 20 and prevents further upward movement of the handles 20. The handles 20 have grips 24 at each end to enable an operator to manipulate and rotate the housing 4 during an inspection of the interior of the tank or other vessel being viewed.

As best seen in FIG. 4, video camera/recorder housing 8 includes a cover plate 26 having a sealed lens cover 28 fabricated from Lexan or similar lens material to enclose opening 30 of housing 8. The lens cover 28 is sealed through the use of an O-ring groove 28a formed in annular flange 32 surrounding opening 30. An O-ring 34 is compressed into the groove 28a by cover plate 26 being affixed to housing 8 by a plurality of screws 36 extending through ring 37. Housing 8 encloses a conventional video camera/recorder 40 in a seal environment. An example of a commercially available video camera/recorder that is suitable in the invention of the application is sold under the trademark SONY as a Model TR-31 8 mm camera recorder having a ten power magnification fitted with a 2× telephoto lens 42 bringing the magnification capability up to 20×. It is desirable that the telephoto lens 42 also have a circular polarizer effect lens to reduce glare from the light emanating from light housing 6.

The light housing 6 is also includes an opening 44 that is enclosed by a sealed lens cover 46, such as a Lexan lens. As seen in FIG. 4 the lens cover 46 is affixed by threaded member 46a and O-ring 46b to a flange 48 surrounding opening 44. An O-ring 48a is mounted in groove 49 to seal the interior of the light housing 6. A light source 50 is mounted within light housing 6 by a suitable mounting (not shown) to illuminate the areas being inspected by the video camera/recorder 40. Although any suitably bright light source 50 may be used, a commercially available light source, namely a General Electric, Part No. 4509 dual filament sealed beam unit is provides efficient results in the operation of the invention. The light produced by the light source 50 produces a narrow beam giving it the ability to penetrate total darkness in the tank of a rail car or other enclosed space. In use of interior inspection apparatus 2, highly satisfactory illumination has been attained by having the image of the video camera/recorder 40 being directed above the light beam of light source 40 in a slight criss-crossing path for enhanced viewing of the interior. The Lexan glass lens covers of both the light housing 6 and the video camera housing 8 are capable of withstanding high temperatures and exhibit high resistance to many different types of chemicals which may exist within the environment of the tank or vessel.

As seen in FIG. 3, a color video monitor 60 is suitably mounted on a support bracket 62 within the monitor housing 10. The monitor housing includes an opening 64 covered by a lens cover 66, such as a Lexan lens, in alignment with the viewing screen of monitor 60. The monitor housing 10 also includes a cylindrical flange 68 having a continuous groove 70 to receive an O-ring 72 for sealing. The O-ring presses against the interior of the lens cover 66, while the hood 10a is mounted in sandwiched relationship with the lens. The hood 10a includes a peripheral flange 72 through which a plurality of threaded members 74 extend to seal the interior of monitor housing 10.

Figure 5:
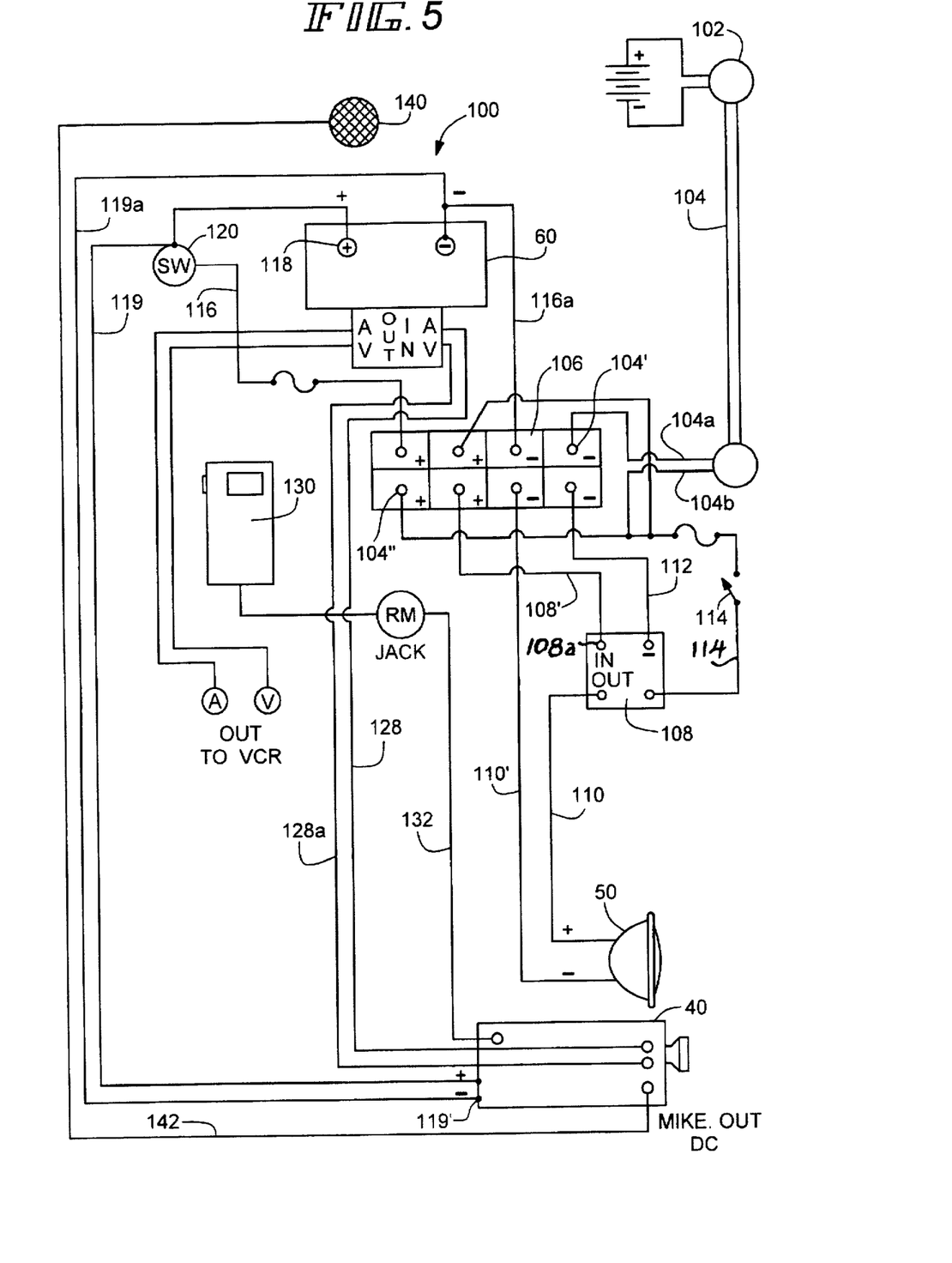
FIG. 5 is schematic illustration of the electrical control circuit of the imaging apparatus of FIG. 1.

Referring to FIG. 5, there is illustrated the control circuit 100 for the interior inspection apparatus 2 of the invention. The interior inspection apparatus 2 is electrically energized by a rechargeable 12 volt battery 102 which powers the monitor 60, light source 40 and video camera 30. The battery 102 is electrically connected to the circuit of the inspection apparatus 2 by an elongated electrical cable 104, which may be approximately 20 feet in length, such that the heavy battery may remain on the ground surface during an inspection operation. The leads 102a, 102b of cable 102 are attached to terminals 104', 104" of a double, row six circuit terminal block 106.

The "in" terminal 108a of a 12 volt, 30 ampere relay, HFB buss 108 is connected by lead 108' to a positive terminal of block 106. The output of the relay 108 is connected to the positive terminal of the light source 50 through electrical lead 110. The negative terminal of light source 50 is connected to the block 106 by lead 110'. Negative terminals of terminal block 106 and relay 108 are connected by lead 112. Operation of the light source 50 is activated and/or deactivated by power switch 114 connected to line 114 between positive terminals of relay 108 and terminal block 106. A pair of leads 116, 116a are respectively connected between plus and minus terminals of the terminal block 106 and the plus and minus terminals of monitor 60 having a 12 volt to 6 volt power converter 118, such as, for example, a commercially available Tundra VRL-18 12 volt to 6 volt power converter. Leads 119, 119a connect terminal block 6 to the video camera 50 through a 12 volt to 6 volt power converter 119' of the same type as converter 118.

A switch 120 is present in lead 116a to control on/off power from terminal block 6 to video camera/recorder 40 and TV monitor 60 respectively through leads 124, 124a and leads 126, 126a. The A-V output of video camera 50 is applied through the input to the monitor 60 through leads 128, 128a. A wired remote control operator 130 is connected through lead 132 to video operation to control its operation. The wired remote operator 130 may be a commercially available Sony RM-95 remote commander. A microphone 140, which can be oriented adjacent to the operator at the hood 10a during inspection, is attached by a jack through lead 142 to the video camera 40 and permits the operator to make verbal observations during visualization of the interior for recording on the video tape. Thus, it should be apparent that the video camera 50, having a magnification capability of 1× to 20× under the illumination of the sealed beam, permits an operator to visualize the interior through manipulation of the device 2 while recording the image on video tape (not shown) with verbal observations being recordable through microphone 140. The remote commander provides numerous control features of the camera as are conventional to allow for proper visualization for enhanced results and quality assurance.

Figure 6:
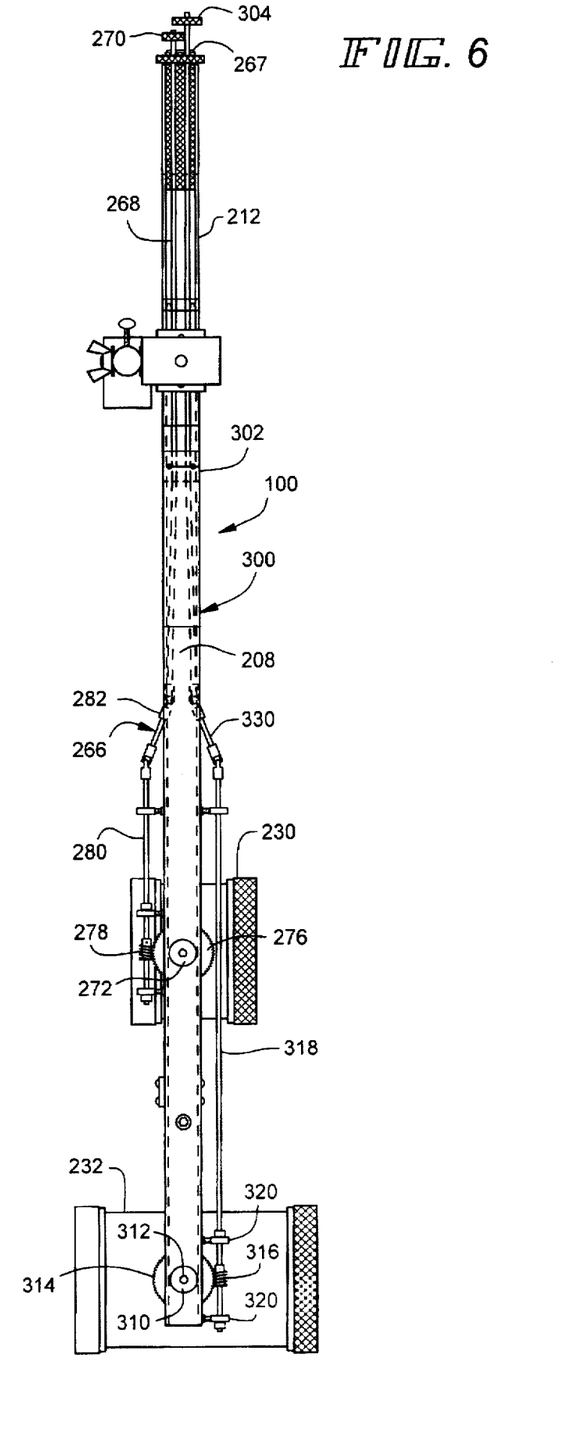
FIG. 6 is a side elevational view of a second embodiment of the interior inspection apparatus of the invention.
Figure 7:
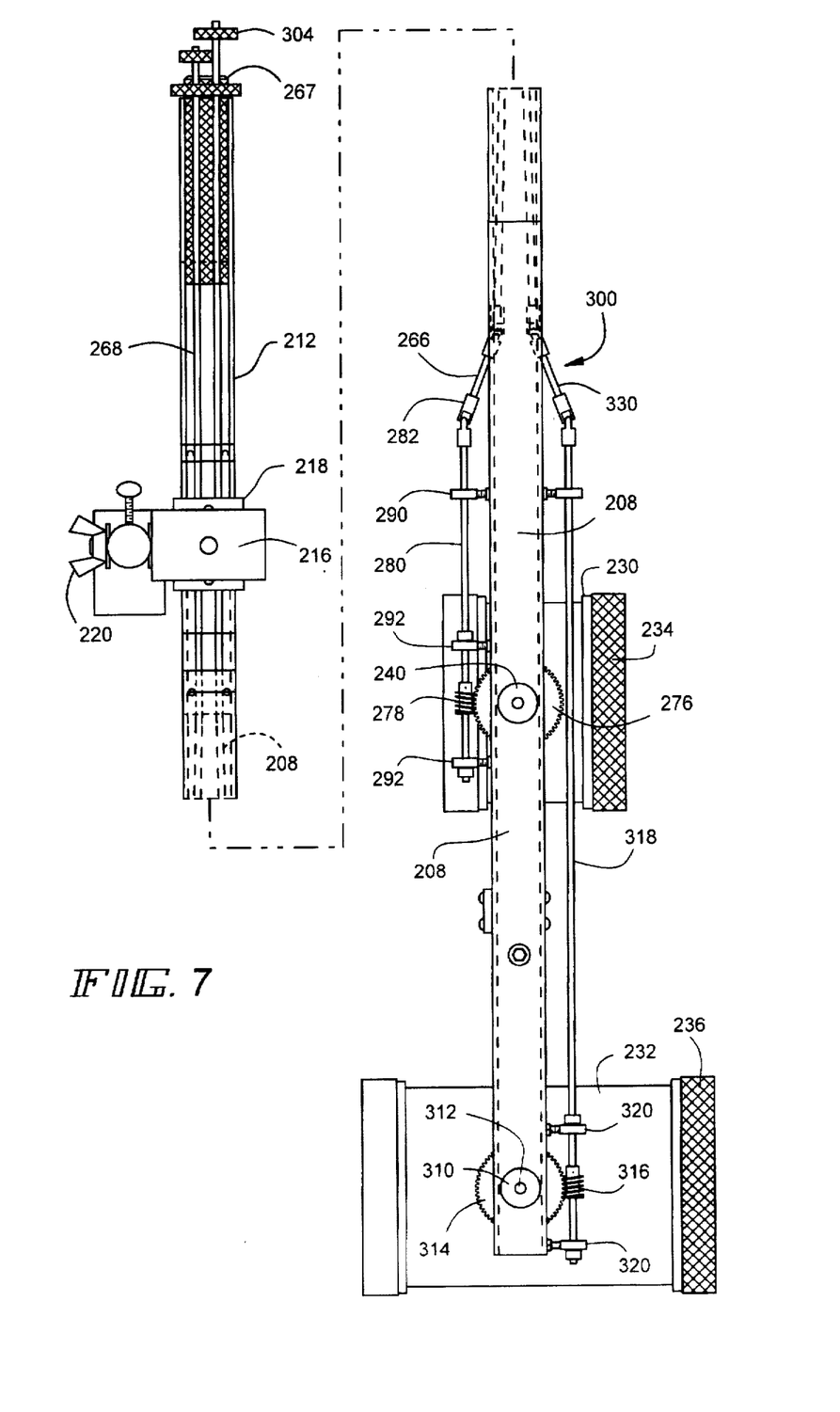
FIG. 7 is an enlarged side elevation of the second embodiment of the interior inspection apparatus.
Figure 8:
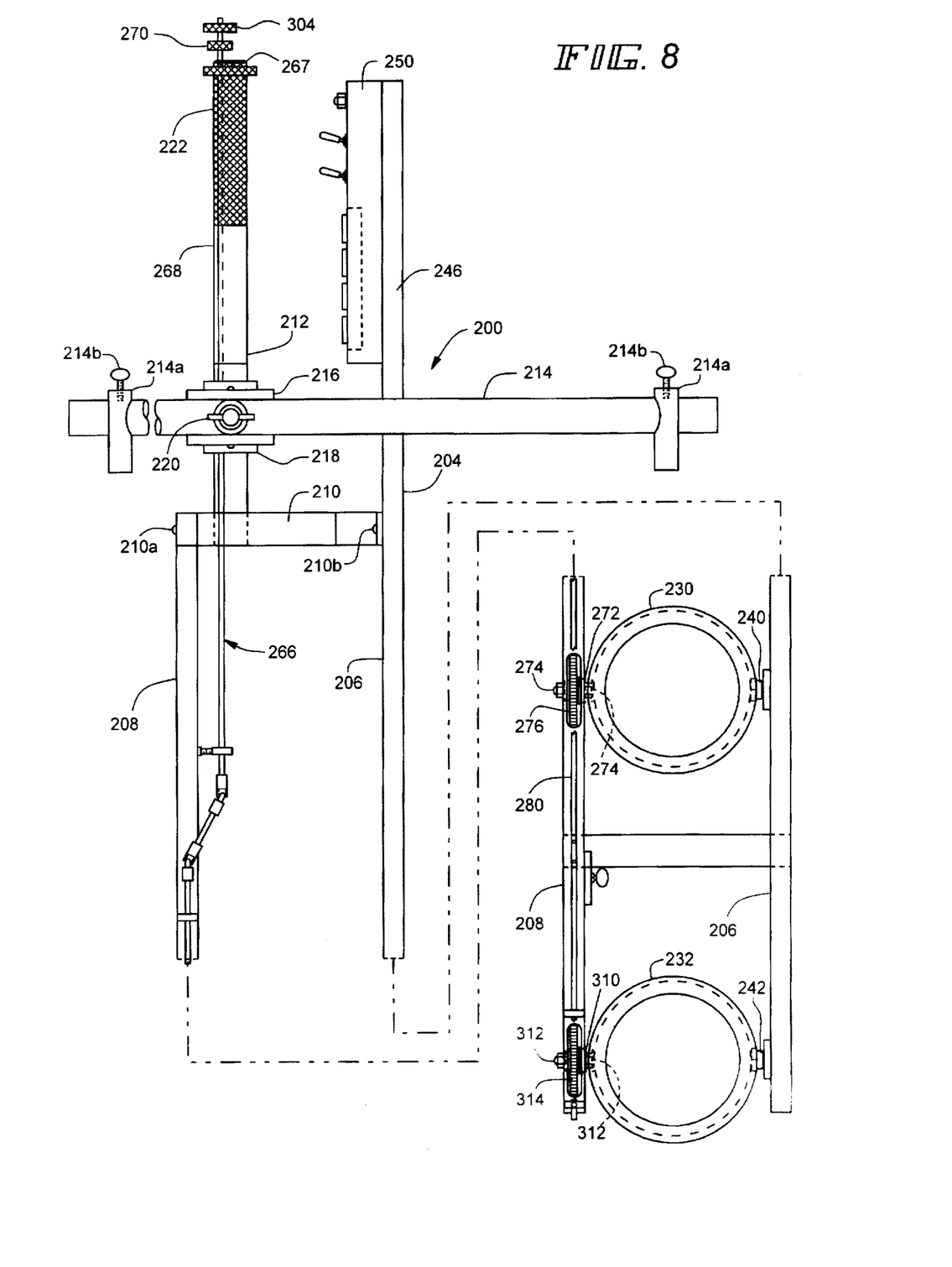
FIG. 8 is a front elevational view of the interior inspection apparatus of FIG. 6.

Referring to FIGS. 6, 7, and 8, there is illustrated the second embodiment of the imaging apparatus of the invention, generally designated by reference numeral 200. Imaging apparatus 200 is used for inspecting and evaluating the condition of the interior of a vessel, tank, or other enclosed space into which access is limited or in which hazardous conditions are present similarly as accomplished by the embodiment described previously with reference to FIGS. 1–5. The imaging apparatus 200 includes a support frame assembly 204 having a pair of downwardly extending sealed lower tubes 206 and 208. The tubes 206 and 208 are interconnected by a cross member 210 suitably retained on tubes 206 and 208 through the use of conventional fasteners 210a and 210b. The cross member 210 further receives in fixed relationship the bottom end of a upper hollow tube 212 in a manner that the end of the upper tube 212 extends through the cross member 210 and includes an open bottom end.

The upper tube 212 further is connected to a cross support member 214 which is arranged to be secured to the hatch opening and the like (not shown) of a vessel, tank, or other enclosed space into which the apparatus is inserted. The cross support arm 214 includes opposed clamps 214a which are adjustable along its length through the use of set screws 214b for adjusting the width of the support of the imaging apparatus. The clamp 214a may be adjusted according to the size of the opening in which the device is to be supported for retention. The set screws 214b may be loosened to move the clamps 214a and tightened at a fixed relationship, such that the cross support arm 214 is rigidly retained by being bias against a structural portion surrounding the access opening.

The upper tube 208 is journaled on the cross support arm 214 by means of a tubular member 216 and a bearing assembly 218 which allows the upper tube to be rotated relative to the fixed support arm 214 or moved up or down to vary the depth of the imaging apparatus 200 within the enclosed space. A wing threaded member 220 extends through the arm 214 and has an end passing through the bearing assembly 216 to contact the upper tube 212 when tightened. Upon loosening the thumb screw 220, the tube 212 may be rotated relative to the cross support arm 214. The upper portion 222 of the upper tube 212 is formed with a roughened surface to facilitate rotation of the upper tube 212 along with an orbiting motion of the lower tubes 206 and 202 unitarily connected by cross member 210.

As seen in FIGS. 6, 7, and 8, a sealed light housing 230 and a sealed camera housing 232 are mounted for pivotal movement on lower tubes 206 and 208. The housing 230 encloses in a sealed manner a light source (not shown) capable of illuminating the interior of the enclosed space being inspected. As in the previous embodiment described with reference to FIGS. 1–5, the light housing 230 and the video housing 232 can be enclosed by a lens covers 234 and 236, each having a Lexan lens. As seen in FIGS. 6 and 7, the lens cover 234 and 236 respectively of the light housing 230 and video camera housing 232, which are threadedly attached to the open ends of the housings 230 and 232, can be removed. The video camera housing 232 seals a video camera (not shown) having a magnification capability of 1× to 20× under the illumination of the sealed beam from light source 230 and permits an operator to visualize the interior of the enclosed space in a manner to be described. Both the light source and the video camera may be of the type previously described with reference to the embodiment of FIGS. 1–5.

As further seen in FIG. 8, the video housing 232 is journaled for pivotal movement on tube 206 by bearing and block assembly 240. The bearing assembly 240 is provided with a sealed opening (not shown) into the interior of the sealed housing 230 to direct electrical leads into the housing 230 to control the illumination of the light source therein. Similarly, the lower video camera housing 232 is journaled by a bearing block assembly 242 on the tube 206 and includes an internal passage (not shown) between the interior of the lower tube 206 and the interior of the housing 232 to direct electrical leads into the video housing 232 to control operation of the video camera which has multiple functions which are well known in the art. The upper portion 246 of the lower tube 208 extends through the support member 214 and is arranged to support a control panel 250 which includes controls to activate the light source and the video camera and otherwise control operation of the video camera (not shown) in video housing 232, such as to operate the zoom lens, record and the like. The connections to the control panel 250 are provided by electrical leads from the tube 206 which are plugged into jacks (not shown) in the control panel 250 which are connected to a power source within the control panel 250. The control panel 250 further includes jacks to permit a video monitor or a display unit in a helmet for an operator to visualize the conditions within the enclosed space and to provide verbal descriptions during a taping operation for recording. The control panel further includes a suitable low voltage, self-contained power source to provide electrical potential to the circuits of the invention.

Control of the angular orientation of the light housing 230 is provided by an elongated light housing linkage assembly 266 which extends from the top of the upper tube 222 downward into the lower tube 208 in coupled relationship to light housing 230. As seen in FIGS. 6, 7, and 8, the rod assembly 266 includes an elongated upper rod portion 268 which extends through the upper tube 222 and extends through its bottom opening. The rod assembly 266 is journaled for rotation on the top of a cover 267 of tube 222 and includes a portion extending outward with a rotatable control knob 270 being positioned for manipulation.

The light source housing 230 is journaled on the tube 208 by bearing block assembly 272. A rotatable shaft 274 supports a gear segment 276 exteriorly of the tube 208. The gear 274, which is fixedly retained on shaft 276, extends from the block bearing assembly 272 engages a worm gear 278 suitably retained on an end portion of the elongated rod assembly 266. The upper portion 268 of the control rod assembly 266 is interconnected to the lower portion 280 of the rod assembly 266 on which the worm gear 278 is fixedly mounted. The lower portion 280 of the rod assembly is interconnected through suitable bearings to a angular coupling section 282. The coupling section 282 transmits rotation of the upper rod 268 downward to rotate the lower portion 280 of the control rod assembly 266. The lower rod portion 280 is journaled on an upper bracket 290 and two lower brackets 292. It should be apparent from the foregoing that rotation of the rod assembly 266 will cause rotation of the worm gear 278 to rotate the gear 276 and vary the angular orientation of the light housing 230 about a generally horizontal axis and hence the direction of the light beam emanating therefrom.

Similarly, the video camera housing 232 is retained on a video control rod assembly 300 having an upper portion 302 that extends through the upper tube 212 as seen in FIGS. 6 and 7. The upper rod portion 302 also has a portion extending beyond the upper cover 267 of the upper tube 212. A control knob 304 is mounted on the end of upper rod portion 302 in a manner to rotate it similarly as the light control rod assembly 266. The camera housing 232 is also rotatably journaled on the lower tube 206 through a bearing assembly 310 which has a rotatable shaft 312 extending therethrough. A gear 314 is fixedly retained on the shaft 312 and engages a worm gear 316 which is fixedly retained on a lower rod portion 318 of video control rod assembly 300. The lower rod portion is journaled on a pair of bearing brackets 320. An intermediate coupling section 330 having outer bearing portions angularly connect the upper rod portion 302 to the lower rod portion 318. As in the case of the adjustment of the light housing 230, the orientation of the video camera housing 232 can be varied to by rotation of shaft 232 through rotation of rod assembly 300.

Figure 9:
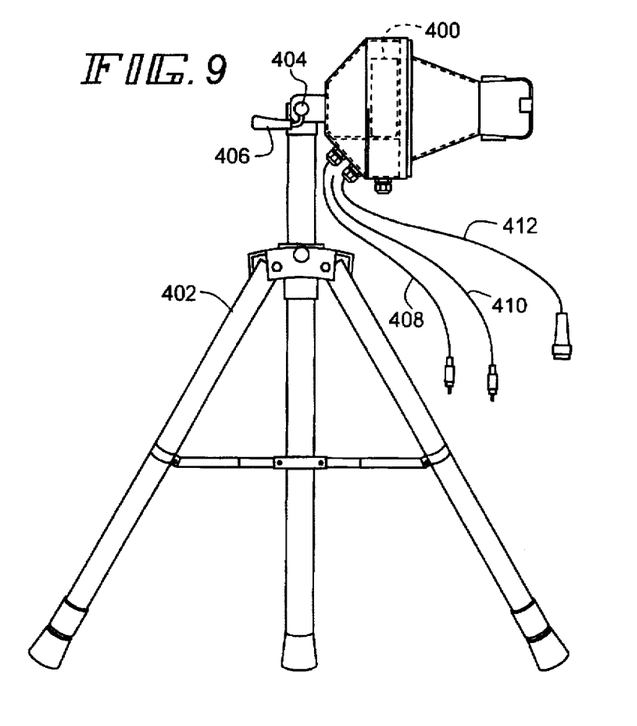
FIG. 9 is a side elevational view of video display unit of the interior inspection apparatus of FIG. 6.
Figure 10:
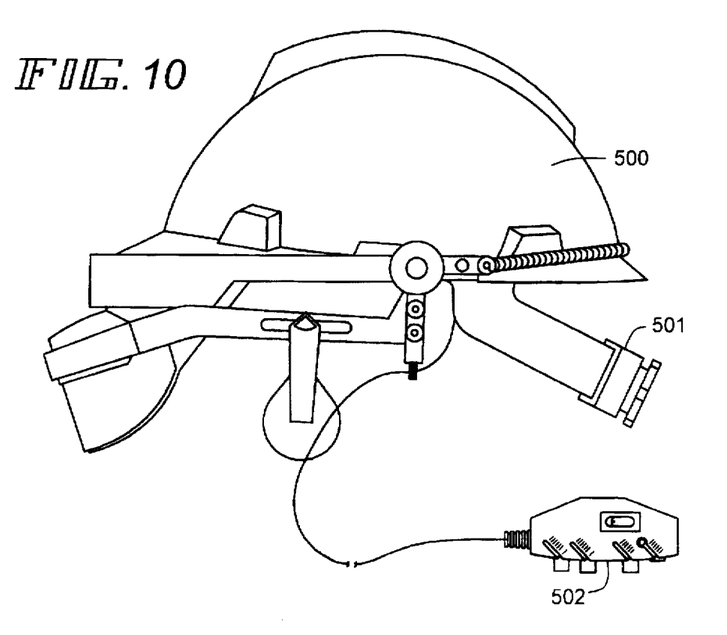
FIG. 10 is a side elevational view of the display helmet of the invention.

As seen in FIG. 9, a monitor housing 400 containing a video monitor is adjustably supported on the upper end of a tripod 402. A threaded member 404 having a handle 406 attaches the monitor housing 400 to an adjustable vertical shaft 408 of the tripod 402. The threaded member 402 may be loosened to rotate the monitoring housing 400 about a horizontal axis to vary its orientation for the convenience of the operator. The monitor housing 400 includes leads 410, 412, and 408 to connect the video monitor to the control panel 250 for viewing the output of the video camera in housing 232. A microphone (not shown) may be provided in housing 400 for audio observation by the operator. Referring to FIG. 10, a helmet 500 having a visual video display 501 may be used in connection to the control panel 250 and has individual controls 502 to operate the video camera, the light camera, and audio for recording observations during the inspection operation.

What is claimed is:

1. An inspection apparatus for viewing the interior of an enclosed space of a structure comprising
    body means including an elongated tube having a lower portion and an upper portion disposed along a first axis,
    said lower portion being arranged to be inserted into the enclosed space,
    support means affixed to said body means for supporting said body means on the structure,
    a first housing having a light source and a second housing having a video camera means, means for rotatably mounting said first housing and said second housing on said lower portion respectively about a pair of axes generally transverse to said first axis,
    mechanical linkage means extending from said upper portion to said lower portion and being operatively coupled to said means for rotatably mounting said first housing and said second housing,
    said linkage means having control means mounted externally of the enclosed space in operative connection to said linkage means and acting to selectively rotate said first housing and said second housing respectively about said transverse axes,
    said means for rotatably mounting said first housing and said second housing included gear means coupled to said linkage means,
    said linkage means includes a pair of elongated rods extending from said upper portion to said lower portion, said gear means being connected to said elongated rods,
    said pair of elongated rods are respectively coupled to said first housing and said second housing, and
    said pair of elongated rods are rotatably mounted on body means, said control means being connected to said pair of rods to independently rotate one of said rods and rotate one of said first housing and said second housing.

2. The inspection apparatus according to claim 1 wherein said gear means include a gear and a worm gear.

3. The inspection apparatus according to claim 1 wherein said control means includes a pair of knobs respectively attached to said pair of rods.

4. The inspection apparatus according to claim 1 wherein said support means includes adjustment means for adjusting the width of said support means.

5. An inspection apparatus for viewing the interior of an enclosed space of a structure through an opening comprising
    body means including a pair of elongated tubes disposed along a pair of parallel axes,
    said pair of elongated tubes being arranged to be inserted into the enclosed space,
    support means affixed to said body means for supporting said body means on the structure with said pair elongated tubes extending into the enclosed space,
    a first housing having a light source and a second housing having a video camera means, means for rotatably mounting said first housing and said second housing between said pair of tubes respectively about a pair of axes generally transverse to said parallel axes,
    linkage means being supported by said support means and one of said pair of elongated tubes, said linkage means from a position external of the enclosed space to a position in operative connection to said first and second housing within the enclosed space for causing independent rotatable movement of said first housing and said second housing and
    said linkage means having control means mounted on said support means externally of the enclosed space and acting to selectively rotate said first housing and said second housing respectively about said pair of transverse axes.

6. The inspection apparatus according to claim 5 wherein said linkage means includes first and second elongated linkages, said elongated linkages being rotatably mounted on said support means, said first linkage being operatively coupled to said first housing and said second linkage being operatively connected to said second housing.

7. The inspection apparatus according to claim 6 wherein said means for rotatably mounting said first housing and second housing includes gear means coupled respectively to said first housing and said first linkage and to said second housing and said second linkage.

8. The inspection apparatus according to claim 5 wherein said housing means includes a cross member interconnecting said pair of elongated tubes for support.

9. The inspection apparatus according to claims 5 wherein said support means includes a member having a length for spanning the opening of the enclosed structure, means for affixing said member to the structure adjacent the opening.

10. The inspection apparatus according to claim 9 wherein said means for affixing said member is adjustable along said length of the member.

11. The inspection apparatus according to claim 5 further including an electric control panel being mounted on the other of said pair of elongated tubes at a position exterior of the enclosed space, said other of said pair of elongated tubes being arranged to receive an electrical circuit between said control panel and said first and second housing in a sealed relationship.

* * * * *